(12) United States Patent
Haberkamp et al.

(10) Patent No.: US 6,444,006 B1
(45) Date of Patent: Sep. 3, 2002

(54) HIGH TEMPERATURE COMPOSITE CERAMIC FILTER

(75) Inventors: William C. Haberkamp, Cookeville, TN (US); Thomas M. Yonushonis, Columbus, IN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/573,747

(22) Filed: May 18, 2000

(51) Int. Cl.[7] .......................... B01D 29/07; B01D 39/20
(52) U.S. Cl. ..................... 55/521; 55/523; 55/524; 55/DIG. 30
(58) Field of Search ...................... 55/523, 521, 524, 55/DIG. 30

(56) References Cited

U.S. PATENT DOCUMENTS

| | | |
|---|---|---|
| 3,112,184 A | 11/1963 | Hollenbach |
| 4,017,347 A | 4/1977 | Cleveland |
| 4,398,931 A | 8/1983 | Shevlin |
| 4,652,286 A | 3/1987 | Kusuda et al. |
| 5,042,249 A | 8/1991 | Erdmannsdoerfer |
| 5,075,160 A * | 12/1991 | Stinton et al. ............... 428/282 |
| 5,196,120 A * | 3/1993 | White ......................... 210/504 |
| 5,250,476 A | 10/1993 | Mogensen et al. |
| 5,322,537 A | 6/1994 | Nakamura et al. |
| 5,567,536 A | 10/1996 | Lintz et al. |
| 5,611,832 A * | 3/1997 | Suzuki et al. .................. 55/523 |

* cited by examiner

Primary Examiner—Robert A. Hopkins
(74) Attorney, Agent, or Firm—Andrus, Sceales, Starke & Sawall, LLP

(57) ABSTRACT

A high temperature composite ceramic filter having particular use as a diesel engine exhaust filter. An aqueous slurry containing short ceramic fibers, organic fibers and a water soluble thermoplastic binder is formed into a sheet and dried. The dried sheet is then fabricated into a three-dimensional green filter structure and a binder, either a liquid solution of a thermosetting resin or a colloidal solution of a ceramic material, is applied to the filter structure to increase the temperature stability of the green structure. The filter structure is then fired at an elevated temperature sufficient to remove the organic constituents and is subsequently coated with silicon carbide by a chemical vapor deposition process to provide a composite ceramic filter having high temperature resistance, durability and improved performance.

1 Claim, 2 Drawing Sheets

HIGH TEMPERATURE COMPOSITE CERAMIC FILTER

BACKGROUND OF THE INVENTION

The invention relates to a high temperature, composite ceramic filter having particular use as a diesel engine exhaust filter, and to a method of forming the same.

As regulatory agencies have recently mandated the reduction of particulate emissions in diesel engines, there has been increased activity in the development of exhaust gas filters for diesel engines. A typical exhaust filter will trap the particulate material contained in the exhaust stream, and to prevent clogging of the filter and the resultant increase of load on the engine due to increased back pressure, the particulate material is then burned from the filter.

As a diesel engine exhaust filter must have high temperature resistance and durability, it has been proposed to utilize ceramic materials as the filter media. For example, a ceramic filter for use in gas turbine engines is described in U.S. Pat. No. 4,017,347. In this patent, a ceramic tape or sheet is prepared from a slurry containing ceramic particles and a two-resin binder system composed of a thermoplastic resin and a thermosetting resin. The tape is formed into a filter structure and the structure is then fired to sinter the ceramic particles and burn out the organic constituents, thus producing a sintered ceramic cellular structure.

U.S. Pat. No. 5,322,537 discloses an exhaust gas filter for diesel engines composed of ceramic fibers, such as aluminosilicate fibers, and an inorganic binder having a softening temperature lower than that of the ceramic fiber.

U.S. Pat. No. 4,652,286 also describes a ceramic exhaust filter for diesel engines having a corrugated or honeycomb structure made of sheets consisting of ceramic fibers and a fire clay binder.

SUMMARY OF THE INVENTION

The invention is directed to a high temperature composite ceramic filter having particular use as a diesel engine exhaust filter, and to a method of making the same.

In carrying out the invention, an aqueous slurry is initially produced containing random length ceramic fibers, organic fibers and a water soluble thermoplastic binder. The ceramic fibers, such as alumina, have high temperature resistance, being stable to temperatures above 1000° C. The organic fibers can take the form of natural or synthetic materials.

The slurry is formed into a paper-like sheet by conventional papermaking techniques, and the sheet is subsequently dried to evaporate the water and provide a dry flexible sheet.

The sheet is then formed into a green three-dimensional article suitable for filtering. Preferably, the final shape is that of a spirally wound, honeycomb element, composed of flat and corrugated layers, with a colloidal solution of a ceramic material used as an adhesive to join the sheets together along contiguous areas. Opposite ends of alternate channels within the honeycomb structure are sealed by a high temperature cement.

As a feature of the invention, the green filter structure is coated with an intermediate binder to increase its temperature stability. In one form of the invention, the intermediate binder consists of a solvent solution of an uncured thermosetting resin, such as a phenol-formaldehyde resin. The coated part is then air dried and heated to a temperature generally in the range of about 150° C. to 250° C. to crosslink the resin and rigidify the structure. The structure is then pyrolyzed at a temperature generally in the range of 900° C. to 1000° C. in an inert or non-oxidizing atmosphere to convert the organic constituents, i.e. the organic fibers and thermoplastic binder, to carbon char. Firing the structure in the inert atmosphere eliminates gassing of the organic constituents and yields a part suitable for final binder application.

A final coating of silicon carbide is then applied to the filter structure using a conventional chemical vapor deposition process. The silicon carbide coats the haphazardly arranged ceramic fibers, as well as the junctions or intersections between the fibers. The resulting structure is a composite of ceramic fibers, inorganic binders and carbon char, coated with silicon carbide.

In a modified form of the invention, the green filter structure is coated with an aqueous colloidal solution of an inorganic material, such as alumina or alumino-silicate binders. The part is then air dried, heated to a temperature of about 200° C. to 300° C. to remove solvents and dehydrate the colloidal material and then fired at a temperature of 900° C. to 1100° C. in air to remove the organic components. Following this, the final coating of silicon carbide is applied using the chemical vapor deposition process.

The silicon carbide coating thickness is controlled to a level of about 0.5 to 1.5 microns, so that the porosity of the filter structure is not adversely affected and is maintained at a value of 80% void or greater. Because of the silicon carbide coating, the resulting composite filter has improved mechanical strength, 6,000 kPa or greater having been shown, which is 50–100% higher than can be achieved by bonding or sintering the fibers alone. Additionally, there is no significant degradation or loss of pores within the structure so that resistance to gas flow is minimal.

With the method of the invention, a green state part is produced with a production capable process and the geometry of this part is maintained throughout conversion to a high temperature ceramic composite, and this geometry will be retained at the elevated temperatures of about 650° C. to 700° C. needed to regenerate a contaminated filter.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
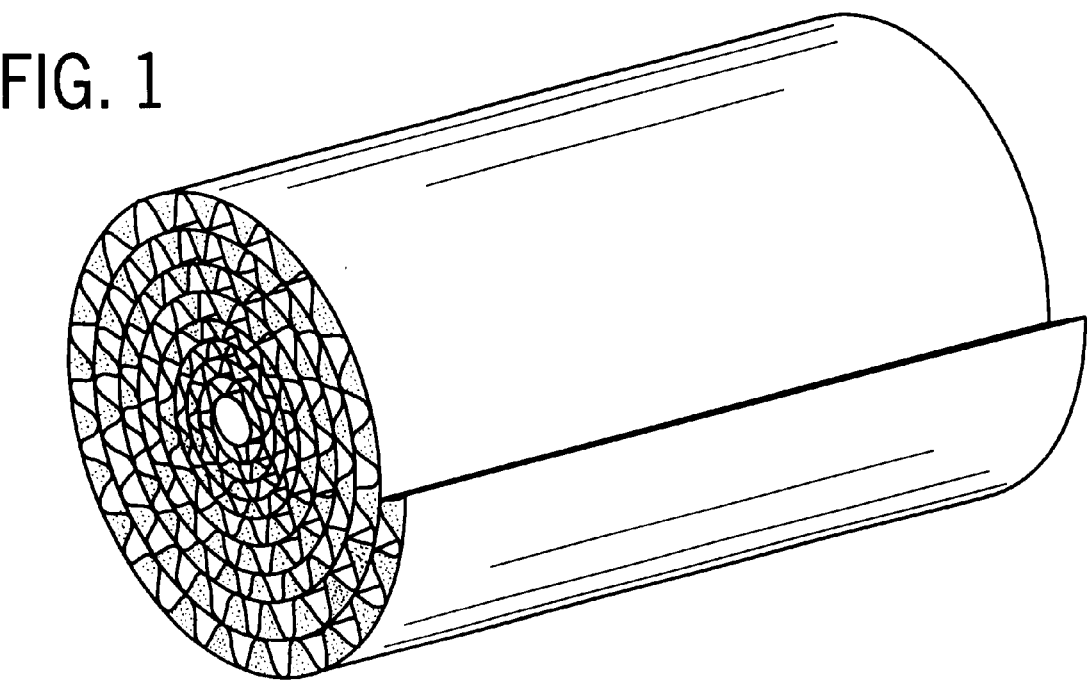
FIG. 1 is a perspective view of a spirally wound filter produced by the method of the invention.

In carrying out the invention, a slurry is initially produced consisting of ceramic fibers, organic fibers, a thermoplastic binder, and a liquid carrier, preferably water.

The ceramic fibers are composed of a material that can withstand temperatures up to about 1200° C. and can take the form of alumina, aluminosilicate, aluminoborosilicate, mullite, and the like. The ceramic fibers have a diameter generally in the range of 1 to 20 microns, and preferably about 2 to 7 microns, and have a length in the range of 0.1 to 10 mm. In general, a length to diameter ratio greater than 100 is desired. On a solids basis, the ceramic fibers generally comprise from 50% to 80% by weight of the slurry and preferably about 70% to 80%. The ceramic fiber is preferably a high purity alumina, such as Saffil, containing less than 5% silica and other impurities.

The organic fibers can be natural fibers, such as wood fibers or hemp, or can be synthetic fibers, such as nylon, rayon, polyester, polypropylene, polyethylene, aramid, arcrylic, and the like. On a solids basis, the organic fibers comprise from about 10% to 50% by weight solids of the slurry, and preferably from 15% to 25%. In a preferred form of the invention, the organic component can consist of a combination of about 10% to 15% by weight of wood pulp fibers and 10% to 15% by weight of synthetic aramid fibers, such as poly-paraphenylene terephthalamide (Kevlar™). The wood pulp fibers, such as northern softwood fibers, improve the wet web strength of the sheet as it is formed on the papermaking machine.

The synthetic organic fiber component is preferably a highly refined or fibrillated type, such as Kevlar wet pulp, and provides mechanical entangling of the ceramic fibers and significantly improves the resistance of the sheet to cutting and tearing allowing it to be pleated or folded without damage. An organic component such as Kevlar maintains its integrity at elevated temperatures, required to cure thermosetting resin binders that may be subsequently added. Kevlar fibers also char to a high carbon content in an inert atmosphere which is beneficial in one of the methods in carrying out the invention.

The thermoplastic binder is preferably a water soluble latex, such as an acrylic latex, Hycar 26138 (BF Goodrich), or the like, and is employed in the slurry in an amount of 2% to 20% by weight of solids, and preferably in the range of 2% to 10%.

The thermoplastic binder has a glass transition temperature above normal ambient temperature, 25° C. or greater, and provides flexibility so that the sheet can be subsequently formed into a three-dimensional configuration. In addition, it may be desirable to add a pH control agent to the slurry to reduce the pH of the aqueous slurry, so that the latex will more readily attach to the fibers. A typical material is alum (ammonium aluminum sulfate) although other materials may be, used to produce a pH of about 5.5 to 6.5.

The amount of water used in the slurry is not critical and should be such that it provides the slurry with a consistency where it can be readily fed from a conventional headbox of a papermaking machine onto a porous moving belt or support in a conventional manner to provide a thin sheet or web. The sheet can be vacuum dried on the porous belt and then subsequently heat dried to remove the remaining water or carrier. The resulting dried sheet consists of haphazardly arranged ceramic and organic fibers bonded by the thermoplastic resin. The dried sheet is flexible and can be folded or deformed and has a porosity generally in the range of 80% to 95% with a mean flow pore diameter of about 10 to 15 microns. The sheet generally has a weight of about 125 to 175 grams per square meter and a thickness of about 0.75 to 1.0 mm. The tensile strength of the dried sheet is greater than 1500 kPa which is suitable for high speed pleating or corrugating processes.

The dried sheet or web can then be formed into any desired three-dimensional article suitable for a filter. The preferred configuration is that of a spirally wound element composed of alternate flat and pleated sections, thus providing a honeycomb structure. More specifically, a first section of the dried sheet is folded or scored to provide a plurality of parallel pleats or corrugations. Alternately, the section can be formed into sinusoidal, rather than angular pleats. In the preferred method, the pleats in cross section define equilateral triangles.

The formed layer or section is then laminated to a flat sheet section and an inorganic, or mixed organic/inorganic, binder is applied to the tips of the folds or flutes to increase the bonding between the layers. The inorganic binder may take the form of a high viscosity, high solids suspension of colloidal alumina or almunosilicate that provides the high temperature resistance required in the finished filter. The organic component in the binder may take the form of an acrylic latex, polyvinyl chloride, polyvinyl alcohol or starch. The organic component acts to increase the tack and surface adhesion of the adhesive.

As the two layers are laminated, the ends of the channels defined by the pleats or flutes at one edge of the pleated sheet are then sealed using a high temperature cement or sealant, such as an alumina complex that may contain particles of alumina or other high temperature material. The sealant may also contain a small amount of an organic material, such as an acrylic latex, polyvinyl chloride, polyvinyl alcohol or starch to improve tack and a surfactant to increase its wetting of the sheet.

The composite structure can then be wound in a spiral fashion to produce a green filter structure, as illustrated in FIG. 1, and the ends of the channels at the opposite edge of the pleated sheet are sealed in a similar manner to create opposing flow channels, thus forcing gas flow through the sheet material in the final product.

In accordance with the invention, an intermediate binder is then applied to the green filter structure to increase its temperature stability. In one form of the invention, a liquid, uncured, thermosetting resin is applied to the green structure, preferably by dipping the structure into the liquid. Various thermosetting resins can be employed as the intermediate binder, such as phenol formaldehyde, urea formaldehyde, epoxy, and the like. The intermediate binders are applied as a solvent solution, and it is preferred to use an uncured phenol formaldehyde resin in a 2% to 5% by weight solution in alcohol.

After application of the uncured thermosetting resin, the structure is air dried to remove the alcohol or carrier and then cured at a temperature of about 150° C. to 250° C. in order to fully crosslink the resin. The resulting structure is no longer thermoplastic in nature, and has increased rigidity so it can be readily handled without deformation.

Following the application of the thermosetting resin, the structure is pyrolyzed in an inert or non-oxidizing atmosphere to fully reduce the organic components to carbon char. The inert atmosphere may be an atmosphere such as nitrogen, and the pyrolyzing is generally carried out at a temperature of about 900° C. to 1100° C. The carbon char acts as a binder to maintain the integrity of the filter structure which is relatively weak, but is temperature stable.

After removal of the organic components through pyrolyzation, a coating of silicon carbide is applied to the structure using a conventional chemical vapor deposition process. The deposition is accomplished in near vacuum at an elevated temperature of about 100° C. The vapor deposition process is a conventional type, as described in Vapor Deposition, edited by Powell, C. F., J. H. Oxley, & J. M. Blocker, Wiley, New York (1966).

Figure 2:
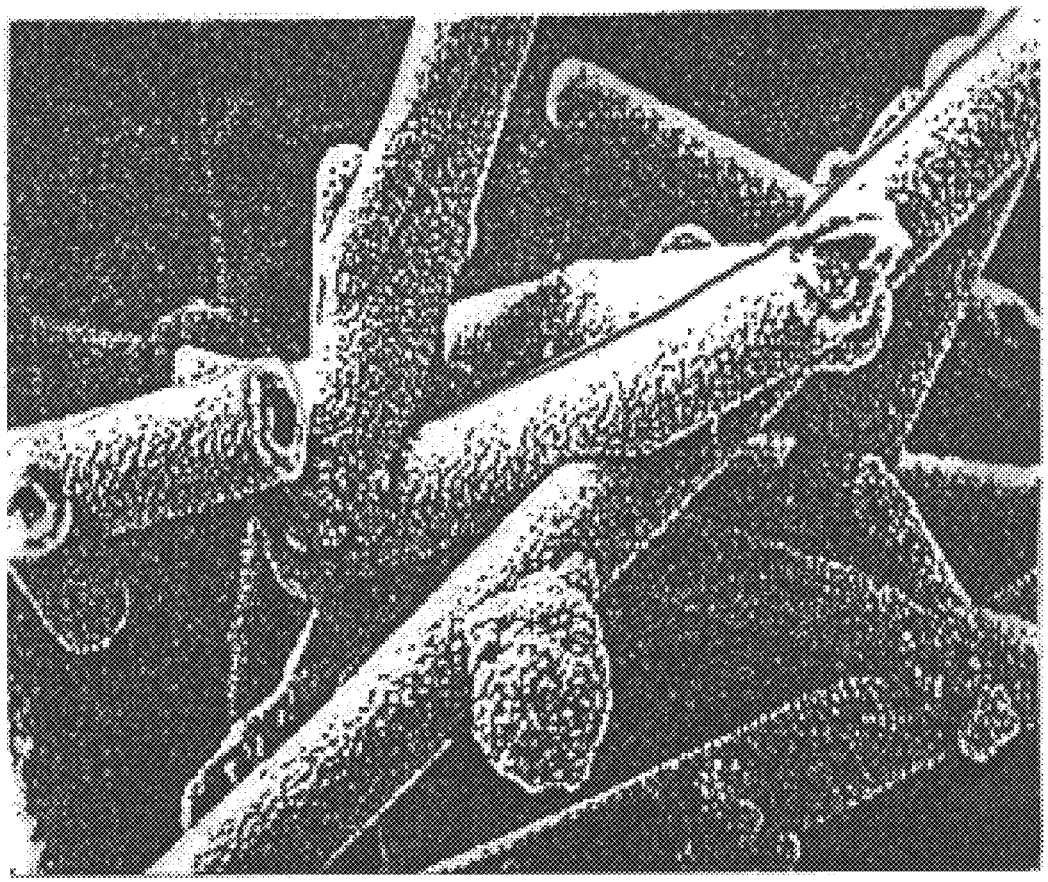
FIG. 2 is a microphotograph showing the fibrous nature of the filter structure having a ceramic fiber core and coating of silicon carbide.

The resulting structure is a composite of haphazardly arranged ceramic fibers, inorganic binder and residual carbon char with a silicon carbide coating that fully covers the fibers, binders and intersections between the fibers. A photomicrograph of the final structure is illustrated in FIG. 2. The vapor deposition of silicon carbide is applied to the entire matrix and is controlled to a thickness of about 0.5 to 1.5 microns. With this thickness, the porosity of the sheet is maintained and is typically about 80% void or greater. Minimal blocking or clogging of the pores in the sheet occurs due to the vapor deposition of the silicon carbide.

The resulting composite filter structure consisting primarily of ceramic fibers and silicon carbide is stable at elevated temperatures of about 650° C. to 700° C. needed to regenerate a filter contaminated with particulate material.

The silicon carbide coating rigidifies the structure, so that the geometry of the structure from the green state is maintained.

In order to minimize flow restriction through the filter, it is preferred that the pleats have a generally equilateral triangle cross section, with the length of a side of the triangle being in the range of 3 to 5 mm and a channel length in the range of 7 to 35 cm. The efficiency and restriction of the complete structure can also be tailored by leaving some portion of the defined channels unsealed or similarly leaving a larger orifice or channel open in the center of the wound structure. A central core may also provide beneficial for a mechanical support mechanism.

The filter media has a degree of texture that is opposed to the flow direction and can be further textured with the addition of inorganic cement material on its outer diameter, thus, improving friction between the filter and its mounting system which is beneficial at high pressure drops encountered as the filter contaminates accumulate.

The filter structure is also suitable for the addition of catalytic materials to improve the oxidation of collected contaminants or reaction upon gaseous species.

The composite ceramic filter of the invention has a high porosity, generally above 80% voids, which reduces engine restriction.

The fibrous filter has improved particle capture efficiency and has increased contaminant holding ability due to the high void content, increased surface area and depth loading. In addition, the filter has high temperature resistance and resilience because of its composite nature.

While FIG. 1 shows the filter as a spirally wound honeycomb structure, the filter can also take other configurations, such as alternate stacked flat and corrugated sheets.

The following examples illustrate the method of producing the composite ceramic filter.

EXAMPLE I 10.5 grams of alumina fibers having an average fiber diameter of 3 microns and length of about 0.01 to 10.0 mm was dispersed in 5000 grams of water to form a slurry or suspension. 1.8 grams of wood fibers were mixed along with 1.8 grams of Kevlar wet-pulp fibers in 1000 grams of water in a Waring blender and then added to the alumina fiber. Also added to the suspension was 2 grams of an acrylic latex binder containing 50% solids. The pH was reduced to 6.0 with the addition of aqueous alum. The suspension was further diluted with 15,000 grams of water. The slurry was then formed into a paper-like sheet using a conventional 12"×12" square papermaking mold machine. The sheet was dried at a temperature of 150° C. and the resulting dried sheet had a porosity of 90%, a mean flow pour diameter of 12 microns, a weight of 150 grams per square meter, and a thickness of 0.95 mm.

Multiple sheets of paper were cut into sections each having a width size of 7.5 cm. One strip was corrugated or pleated on a conventional pleating/corrugating machine, and the peaks of the corrugations were adhered to a flat strip section with an adhesive consisting of a high viscosity colloidal suspension of alumina and latex adhesive. Ends of the channels defined by the flutes at one edge of the corrugated sheet were then sealed by an alumina complex cement. The combined layers were then rolled into spiral form and the ends of the channels at the opposite edge of the corrugated sheet were similarly sealed to create opposing flow channels.

The green spirally wound filter structure was then dipped into a 2% by weight solution of phenol formaldehyde resin in alcohol. The structure was then air dried to evaporate the solvent and heated to a temperature of 175° C. to fully cross-link the resin.

The filter structure containing the thermosetting resin coating was then slowly heated to a temperature 1000° C. in a nitrogen atmosphere for a period of 72 hours causing the organic components to convert to carbon char.

Following the pyrolyzation, a coating of silicon carbide was applied to the structure using a conventional chemical vapor deposition process. In this process, the filter structure was maintained at near vacuum and a temperature of about 1000° C. Through this process a coating of silicon carbide having an average thickness of 0.8 microns was applied to the fibrous structure of the filter.

The resulting filter structure had a porosity of 90% and consisted of haphazardly arranged ceramic fibers, inorganic binders, carbon char and a coating of silicon carbide.

EXAMPLE II

A green filter structure was prepared as described in Example I. The filter structure was then dipped in a 7% by weight colloidal suspension of alumina and the part was then air dried and then heated to a temperature of 250° C. to remove all solvents and dehydrate water. Subsequently, the part was fired at a temperature of 1100° C. in air to remove all the organic components, thus resulting in a structure consisting primarily of haphazardly arranged ceramic fibers and inorganic binders.

The filter structure was then subjected to a chemical vapor deposition process to coat the fibers and the intersections between fibers with a coating of silicon carbide, as described in Example I.

Various alternatives and embodiments are contemplated as being within the scope of the following claims particularly pointing out and distinctly claiming the subject matter regarded as the invention.

We claim:

1. A high temperature composite ceramic filter media, comprising a first sheet, and a second sheet, said second sheet having a plurality of parallel pleats with the tips of the pleats on one side of the second sheet being in contiguous relation with the first sheet, each of said sheets comprising a plurality of haphazardly arranged ceramic fibers, an inorganic binder bonding the tips of the second sheet to the first sheet, and a layer of silicon carbide coating the ceramic fibers and the inorganic binder and providing a rigid high temperature construction, wherein said ceramic fibers have a random length in the range of 0.01 to 10 mm and an average diameter in the range of 2 to 7 microns, said filter media having a porosity greater than 80%.

* * * * *